(12) United States Patent
Gobeli et al.

(10) Patent No.: US 6,767,016 B2
(45) Date of Patent: Jul. 27, 2004

(54) HYDRODYNAMIC ROTARY SEAL WITH OPPOSED TAPERING SEAL LIPS

(76) Inventors: Jeffrey D. Gobeli, 1445 Lakeside Estates Dr., Apt. 2001, Houston, TX (US) 77042; Lannie Dietle, 14838 Sagamore Hills, Houston, TX (US) 77082; Manmohan S. Kalsi, 13307 Carousel Ct., Houston, TX (US) 77041

( * ) Notice: Subject to any disclaimer, the term of this patent is extended or adjusted under 35 U.S.C. 154(b) by 0 days.

(21) Appl. No.: 09/834,354

(22) Filed: Apr. 12, 2001

(65) Prior Publication Data

US 2001/0024016 A1 Sep. 27, 2001

Related U.S. Application Data

(63) Continuation-in-part of application No. 09/314,349, filed on May 19, 1999.
(60) Provisional application No. 60/202,614, filed on May 9, 2000, provisional application No. 60/196,323, filed on Apr. 12, 2000, provisional application No. 60/086,129, filed on May 20, 1998, and provisional application No. 60/113,840, filed on Dec. 24, 1998.

(51) Int. Cl.[7] .............................................. F16J 15/32
(52) U.S. Cl. ....................................... 277/549; 277/559
(58) Field of Search ................................ 277/549, 551, 277/572, 576, 577, 586, 587, 558, 559, 560

(56) References Cited

U.S. PATENT DOCUMENTS

| | | | |
|---|---|---|---|
| 2,679,441 A | 5/1954 | Stillwagon | |
| 2,934,368 A | 4/1960 | Adamson | |
| 3,342,500 A | 9/1967 | Knudson | |
| 3,627,337 A | 12/1971 | Pippert | |
| 3,901,517 A | 8/1975 | Heathcott | |
| 3,929,340 A | 12/1975 | Peisker | |

(List continued on next page.)

FOREIGN PATENT DOCUMENTS

| | | |
|---|---|---|
| CA | 2.145.548 | 2/1995 |
| WO | WO 00/65257 | 11/2000 |
| WO | WO 00/65258 | 11/2000 |
| WO | WO 00/65259 | 11/2000 |

Primary Examiner—Anthony Knight
Assistant Examiner—Vishal Patel
(74) Attorney, Agent, or Firm—James L. Jackson; Andrews Kurth LLP

(57) ABSTRACT

A hydrodynamically lubricating rotary seal for partitioning a lubricant from an environment has a generally circular seal body and sloping, generally opposed projecting static and dynamic sealing lips. The dynamic sealing lip is provided for establishing compressed sealing relation with a relatively rotatable surface, and has a sloping dynamic sealing surface that varies in width, and also has a hydrodynamic inlet curvature that varies in position around the circumference of the seal.

When the seal is installed against a relatively rotatable surface, the dynamic sealing lip deforms to define a variable width interfacial contact footprint against the relatively rotatable surface that is wavy on the lubricant side, and wedges a film of lubricating fluid into the interface in response to relative rotation. The environment edge of the interfacial contact footprint is substantially circular, and therefore does not produce a hydrodynamic wedging action in response to relative rotation.

37 Claims, 7 Drawing Sheets

U.S. PATENT DOCUMENTS

| | | | | |
|---|---|---|---|---|
| 3,942,806 A | | 3/1976 | Edlund | |
| 4,013,299 A | | 3/1977 | Scott | |
| 4,053,163 A | | 10/1977 | Vegella | |
| 4,067,407 A | | 1/1978 | Berg | |
| 4,094,519 A | * | 6/1978 | Heyn et al. | 277/559 |
| 4,174,846 A | | 11/1979 | Scott | |
| 4,193,606 A | | 3/1980 | Iverson | |
| 4,288,083 A | | 9/1981 | Braconier | |
| 4,328,972 A | | 5/1982 | Albertson et al. | |
| 4,387,902 A | * | 6/1983 | Conover | 277/560 |
| 4,410,189 A | * | 10/1983 | Myers et al. | 277/530 |
| 4,441,722 A | | 4/1984 | Pichler | |
| 4,484,753 A | | 11/1984 | Kalsi | |
| 4,610,319 A | | 9/1986 | Kalsi | |
| 4,789,166 A | | 12/1988 | Rericha et al. | |
| 4,917,390 A | | 4/1990 | Lee et al. | |
| 5,002,289 A | | 3/1991 | Yasui et al. | |
| 5,190,299 A | * | 3/1993 | Johnston | 277/559 |
| 5,230,520 A | | 7/1993 | Dietle et al. | |
| 5,482,296 A | | 1/1996 | Peppiatt et al. | |
| 5,678,829 A | | 10/1997 | Kalsi et al. | |
| 5,738,358 A | | 4/1998 | Kalsi et al. | |
| 5,873,576 A | | 2/1999 | Dietle et al. | |
| 6,007,105 A | | 12/1999 | Dietle et al. | |
| 6,036,192 A | | 3/2000 | Dietle et al. | |
| 6,105,968 A | | 8/2000 | Yeh et al. | |
| 6,109,618 A | | 8/2000 | Dietle | |
| 6,120,036 A | | 9/2000 | Kalsi et al. | |
| 6,139,020 A | | 10/2000 | Friend et al. | |
| 6,315,302 B1 | | 11/2001 | Conroy et al. | |

* cited by examiner

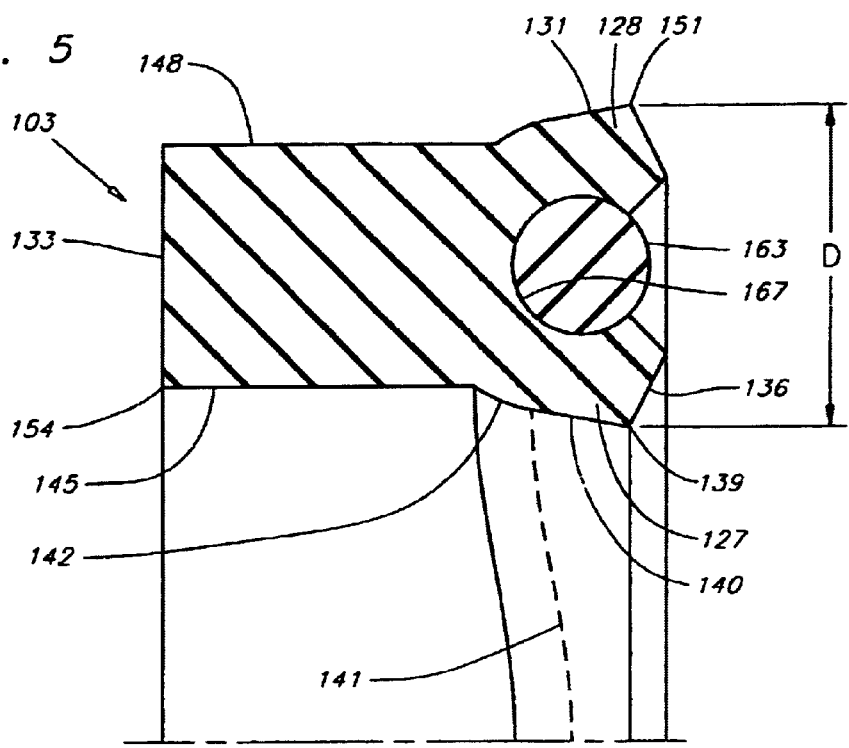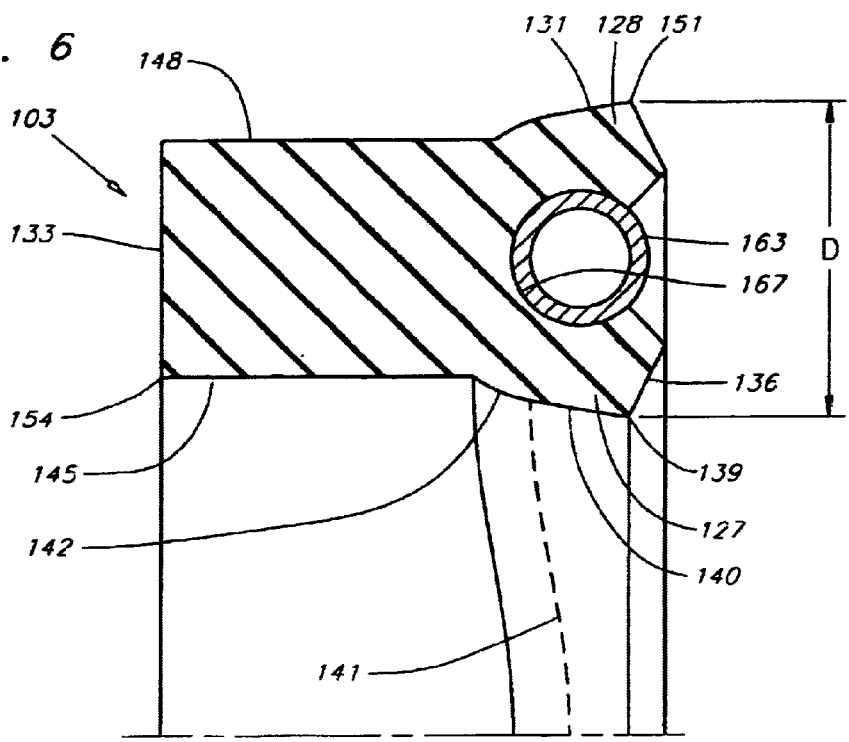

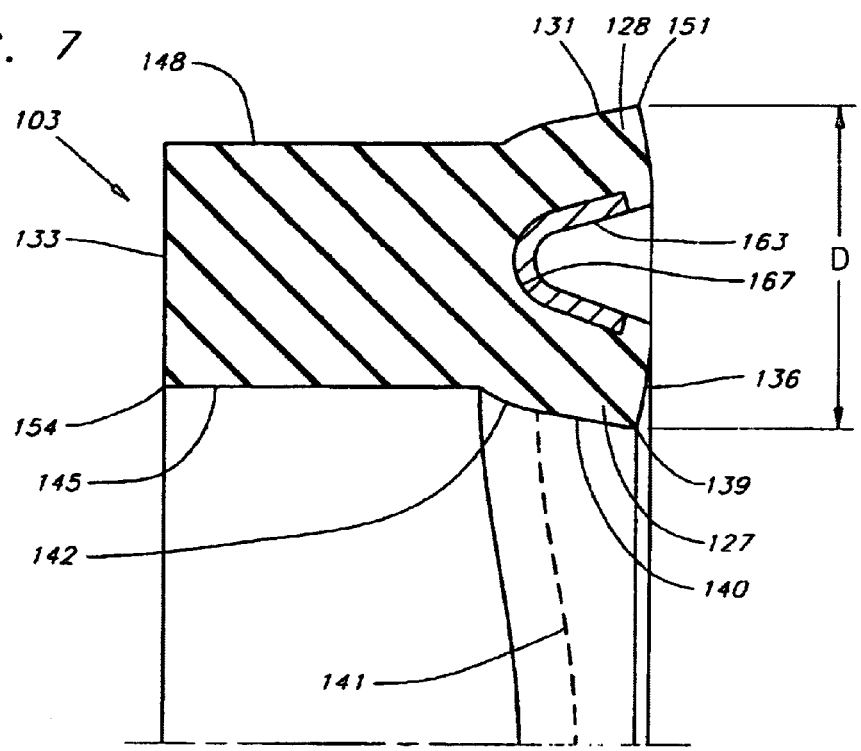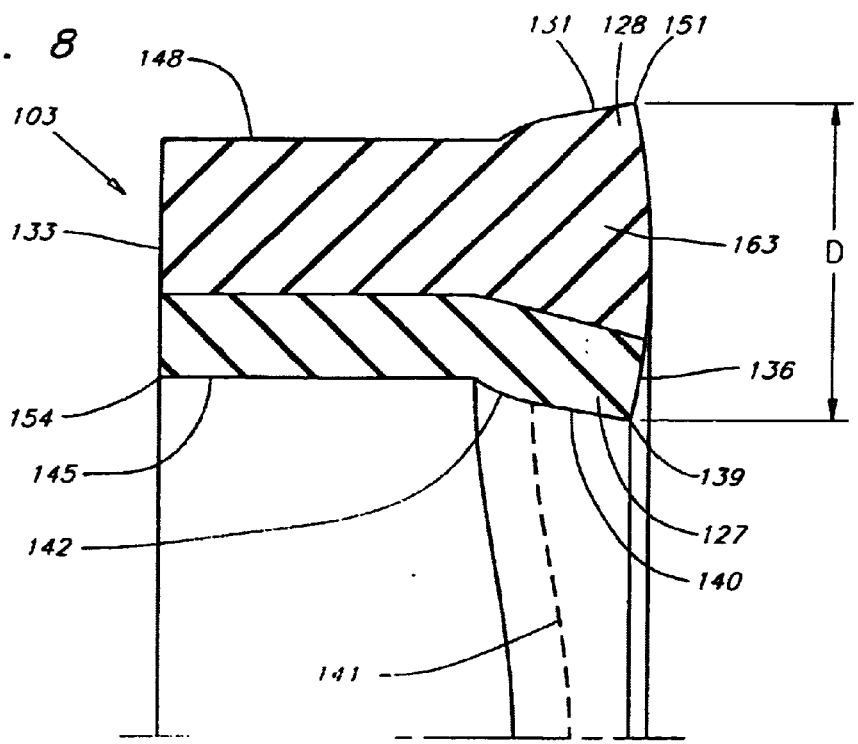

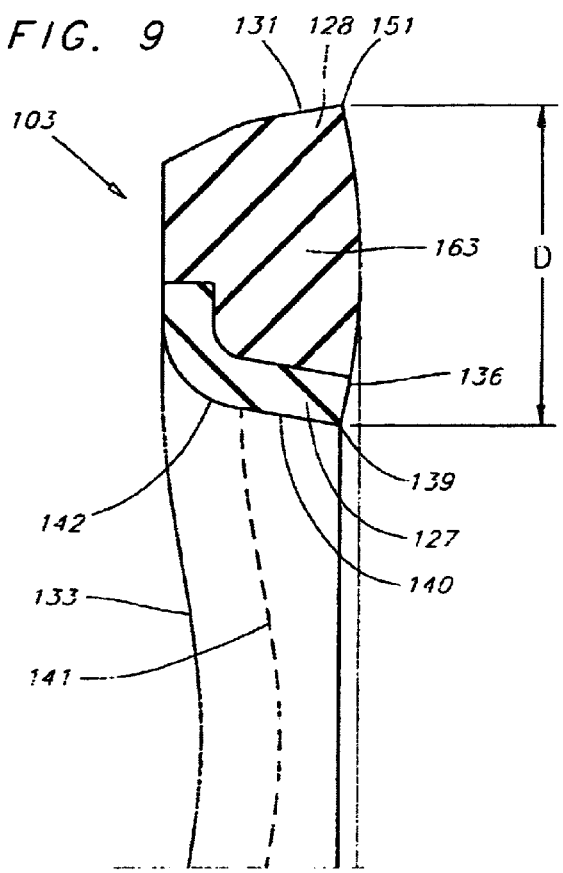
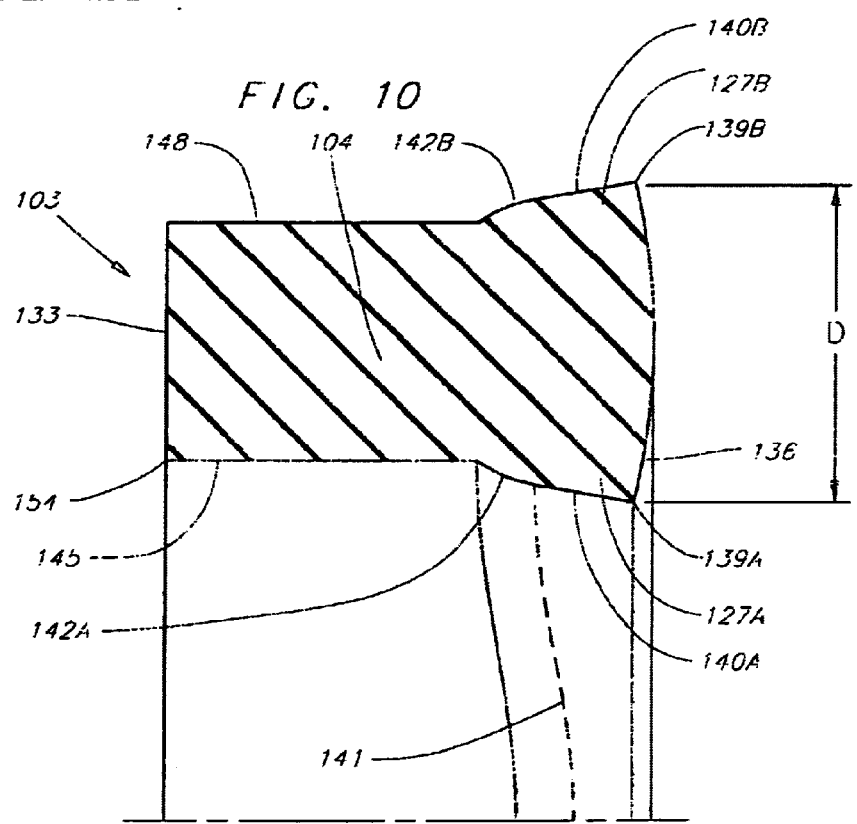

HYDRODYNAMIC ROTARY SEAL WITH OPPOSED TAPERING SEAL LIPS

This is a continuation-in-part of utility application Ser. No. 09/314,349 filed on May 19, 1999 by Lannie Dietle and Manmohan S. Kalsi and entitled "Hydrodynamic Packing Assembly". Applicants hereby claim the benefit of U.S. Provisional Application Serial No. 60/196,323 filed on Apr. 12, 2000 by Lannie L. Dietle and entitled "Hydrodynamic Rotary Seal", and Ser. No. 60/202,614 filed on May 9, 2000 by Lannie L. Dietle entitled "Hydrodynamic Seal", which provisional applications are incorporated herein by reference for all purposes.

BACKGROUND OF THE INVENTION

The present invention relates generally to seals that interact with lubricant during rotation of a relatively rotatable surface to wedge a film of lubricant into the interface between the seal and the relatively rotatable surface to reduce wear. More specifically, the present invention concerns the provision of static and dynamic sealing lips in a hydrodynamic seal that controls interfacial contact pressure within the dynamic sealing interface for efficient hydrodynamic lubrication and environmental exclusion while permitting relatively high initial compression and relatively low torque.

FIG. 1 of this specification represents a commercial embodiment of the prior art of U.S. Pat. No. 4,610,319, and FIG. 1A represents a commercial embodiment of the prior art of U.S. Pat. No. 5,678,829. These figures are discussed herein to enhance the readers' understanding of the distinction between prior art hydrodynamic seals and the present invention. The lubrication and exclusion principles of FIG. 1 are also used in the prior art seals of U.S. Pat. Nos. 5,230,520, 5,738,358, 5,873,576, 6,036,192, 6,109,618 and 6,120,036, which are commonly assigned herewith. The aforementioned patents pertain to various seal products of Kalsi Engineering, Inc. of Sugar Land, Tex. that are known in the industry by the registered trademark "Kalsi Seals", and are employed in diverse rotary applications to provide lubricant retention and contaminant exclusion in harsh environments.

Referring now to FIG. 1, the seal incorporates a seal body 18 that is solid and generally ring-like, and defines a lubricant end 20 and an environment end 22. The seal incorporates a dynamic sealing lip 24 defining a dynamic sealing surface 26 and also defining a exclusionary geometry 28 which may be abrupt, and which is for providing environmental exclusion.

The dynamic sealing lip 24 has an angulated flank 30 having intersection with the seal body at lip termination point 32. Angulated flank 30 is non-circular, and forms a wave pattern about the circumference of the seal, causing dynamic sealing surface 26 to vary in width.

Hydrodynamic inlet radius 38 is a longitudinally oriented radius that is the same size everywhere around the circumference of the seal, and is tangent to dynamic sealing surface 26 and angulated flank 30. Since hydrodynamic inlet radius 38 is tangent to angulated flank 30, it also varies in position about the circumference of the seal in a wavy manner. Angulated flank 30 defines a flank angle 40 that remains constant about the circumference of the seal. The tangency location 42 between hydrodynamic inlet radius 38 and dynamic sealing surface 26 is illustrated with a dashed line.

When installed, the seal is located within a housing groove and compressed against a relatively rotatable surface to establish sealing contact therewith, and is used to retain a lubricant and to exclude an environment. When relative rotation occurs, the seal remains stationary with respect to the housing groove, maintaining a static sealing relationship therewith, while the interface between the dynamic sealing lip 24 and the mating relatively rotatable surface becomes a dynamic sealing interface. The lubricant side of dynamic sealing lip 24 develops a converging relationship with the relatively rotatable surface a result of the compressed shape of hydrodynamic inlet radius 38.

In response to relative rotation between the seal and the relatively rotatable surface, the dynamic sealing lip 24 generates a hydrodynamic wedging action that introduces a lubricant film between dynamic sealing lip 24 and the relatively rotatable surface.

The compression of the seal against a relatively rotatable surface results in compressive interfacial contact pressure that is determined primarily by the modulus of the material the seal is made from, the amount of compression, and the shape of the seal. The magnitude and distribution of the interfacial contact pressure is one of the most important factors relating to hydrodynamic and exclusionary performance of the seal.

The prior art seals are best suited for applications where the pressure of the lubricant is higher than the pressure of the environment. Owing to the complimentary shapes of the seal environment end 22 and the mating environment-side gland wall, the seal is well supported by the environment-side gland wall in a manner that resists distortion and extrusion of the seal when the pressure of the lubricant is higher than the pressure of environment.

If the pressure of the environment is substantially higher than the pressure of the lubricant, the resulting differential pressure-induced hydrostatic force can severely distort body 18, hydrodynamic inlet radius 38 and exclusionary geometry 28. The hydrostatic force presses body 18 against the lubricant-side gland wall, and can cause body 18 to twist and deform such that angulated flank 30 and hydrodynamic inlet radius 38 are substantially flattened against the relatively rotatable surface. Such distortion and flatting can inhibit or eliminate the intended hydrodynamic lubrication, resulting in premature seal wear because the gently converging relationship between dynamic sealing lip 24 and the relatively rotatable surface (which is necessary for hydrodynamic lubrication) can be eliminated. Such distortion can also cause exclusionary geometry 28 to distort to a non-circular configuration and may also cause portions of dynamic sealing surface 26 to lift away from the relatively rotatable surface, producing a low convergence angle between dynamic sealing surface 26 and the relatively rotatable surface on the environment edge, and causing the exclusionary geometry 28 to become non-circular and skewed relative to rotational velocity V. Such distorted geometry is eminently suitable for the generation of a hydrodynamic wedging action in response to relative rotation of the relatively rotatable surface. Such wedging action can force environmental contaminants into the sealing interface and cause rapid wear.

To effectively exclude a highly pressurized environment, one must use a pair of oppositely-facing prior art hydrodynamic seals; one to serve as a partition between the lubricant and the environment, and the other to retain the lubricant, which must be maintained at a pressure equal to or higher than the environment. This scheme ensures that neither seal is exposed to a high differential pressure acting from the wrong side, but requires a mechanism to maintain the lubricant pressure at or above the environment pressure. For example, see the sealed chambers of the artificial lift pump rod seal cartridge of U.S. Pat. No. 5,823,541, and see the first pressure stage of the drilling swivel of U.S. Pat. No. 6,007,105.

Many applications, such as the oilfield drilling swivel, the progressing cavity artificial lift pump, centrifugal pumps, and rotary mining equipment would benefit significantly from a hydrodynamic rotary seal having the ability to operate under conditions where the environment pressure is higher than the lubricant pressure. The resulting assemblies would avoid the complexity and expense associated with using pairs of seals having lubricant pressurization therebetween.

In the absence of lubricant pressure, the compressed shape of the environment end 22 becomes increasingly concave with increasing compression because the compression is concentrated at one end of the seal. This reduces interfacial contact pressure near exclusionary geometry 28 and detracts from its exclusionary performance. In the presence of differential pressure acting from the lubricant side of the seal, the environment end 22 is pressed flat against the wall of the housing groove, which increases the interfacial contact pressure near exclusionary geometry 28 and improves exclusionary performance.

Although such seals perform well in many applications, there are others where increased lubricant film thickness is desired to provide lower torque and heat generation and permit the use of higher speeds and thinner lubricants. U.S. Pat. No. 6,109,618 is directed at providing a thicker film and lower torque, but the preferred, commercially successful embodiments only work in one direction of rotation, and are not suitable for applications having long periods of reversing rotation.

Interfacial contact pressure at hydrodynamic inlet radius 38 tends to be relatively high, which is not optimum from a hydrodynamic lubrication standpoint, and therefore from a running torque and heat generation standpoint. Hydrodynamic inlet radius 38 is relatively small, and therefore the effective hydrodynamic wedging angle developed with the relatively rotatable surface is relatively steep and inefficient.

Running torque is related to lubricant shearing action and asperity contact in the dynamic sealing interface. Although the prior art hydrodynamic seals run much cooler than non-hydrodynamic seals, torque-related heat generation is still a critical consideration. The prior art seals are typically made from elastomers, which are subject to accelerated degradation at elevated temperature. For example, media resistance problems, gas permeation problems, swelling, compression set, and pressure related extrusion damage all become worse at higher temperatures. The prior art seals cannot be used in some high speed or high-pressure applications simply because the heat generated by the seals exceeds the useful temperature range of the seal material.

In many of the prior art seals, interfacial contact pressure decreases toward exclusionary geometry 28, and varies in time with variations in the width of the interfacial contact footprint. Neither effect is considered optimum for exclusion purposes. When environmental contaminant matter enters the dynamic sealing interface, wear occurs to the seal and the relatively rotatable surface.

A certain minimum level of compression is required so that the seal can accommodate normal tolerances, misalignment, seal abrasion, and seal compression set without loosing sealing contact with the relatively rotatable surface. Seal life is ultimately limited by susceptibility to compression set and abrasion damage. Many applications would benefit from a hydrodynamic seal having the ability to operate with greater initial compression, to enable the seal to tolerate greater misalignment, tolerances, abrasion, and compression set.

Prior art seals can be subject to twisting within the housing groove. Such seals are relatively stable against clockwise twisting, and significantly less stable against counter-clockwise twisting, with the twist direction being visualized with respect to FIG. 1. Commonly assigned U.S. Pat. Nos. 5,230,520, 5,873,576 and 6,036,192 are directed at helping to minimize such counter-clockwise twisting.

When counter-clockwise twisting occurs, interfacial contact pressure increases near hydrodynamic inlet radius 38 and decreases near exclusionary geometry 28, which reduces exclusionary performance. Such twisting can also make the seal more prone to skewing within the housing groove.

U.S. Pat. No. 5,873,576 teaches that typical hydrodynamic seals can suffer skew-induced wear in the absence of differential pressure, resulting from "snaking" in the gland that is related to circumferential compression and thermal expansion. If this snaking/skewing is present during rotation, the seal sweeps the shaft, causing environmental media impingement against the seal. U.S. Pat. No. 5,873,576 describes the skew-induced impingement wear mechanism in detail, and describes the use of resilient spring projections to prevent skew. Testing has shown that the projections successfully prevent skew-induced wear in the absence of pressure, as was intended, and as such are an improvement over older designs. However, if the environmental pressure exceeds the lubricant pressure, the differential pressure can, in some embodiments, deform the seal in ways that are less favorable to environmental exclusion.

Referring now to the prior art illustration of FIG. 1A, there is shown a cross-sectional view of a prior art seal representative of the commercial embodiment of U.S. Pat. No. 5,678,829. Features in FIG. 1A that are represented by the same numbers as those in FIG. 1 have the same function as the features of FIG. 1. Solid lines represent the uninstalled cross-sectional condition of the seal, and dashed lines represent the installed cross-sectional condition; note the twisted installed condition.

An annular recess 49 defines flexible body lips 52 and 55, one of which incorporates the dynamic sealing surface 26, angulated flank 30, hydrodynamic inlet radius 38, and exclusionary geometry 28. The reduction of interfacial contact pressure near the circular exclusionary geometry 28 is particularly severe in such seals because of the hinging of the flexible body lips, which angularly displaces the dynamic sealing surface 26 and exclusionary geometry 28. This tends to "prop up" the exclusionary geometry 28 as shown, minimizing its effectiveness.

BRIEF SUMMARY OF THE INVENTION

The present invention relates to generally circular rotary shaft seals suitable for bi-directional rotation that are used to partition a first fluid from an second fluid, and that exploit the first fluid as a lubricant to lubricate at a dynamic sealing interface. It is preferred that the first fluid be a liquid-type lubricant, however in some cases other fluids such as water or non-abrasive process fluid can be used for lubrication. The second fluid may be any type of fluid, such as a liquid or gaseous environment or a process media, or even a vacuum-type environment.

The seal of the present invention is positioned by a machine element such as a housing, and compressed against a relatively rotatable surface, initiating sealing therebetween. The machine element may define a circular seal groove for positioning the seal. When relative rotation occurs, the seal preferably maintains static sealing with the machine element, and the relatively rotatable surface slips with respect to the seal at a given rotational velocity. (Alternate embodiments are possible wherein the seal can slip with respect to both the machine element and the relatively rotatable surface.) The seal defines generally opposed first and second seal ends, and incorporates a dynamic sealing lip and a static sealing lip of generally circular configuration that are in generally opposed relation to one another to minimize compression-induced twisting of the seal cross-section. The dynamic sealing lip defines a sloping dynamic sealing surface of variable width and a hydrodynamic inlet curvature of variable position. The static sealing lip defines a sloping static sealing surface for establishing static sealed relationship with the machine element, and is in generally opposed relation to the sloping dynamic sealing surface.

The variation in position of the hydrodynamic inlet curvature may be sinusoidal, or any other suitable repetitive or non-repetitive pattern of variation. The hydrodynamic inlet curvature can consist of any type or combination of curve, such a radius, and portions of curves such as ellipses, sine waves, parabolas, cycloid curves, etc.

The sloping dynamic sealing surface and the variable position hydrodynamic inlet curvature deform when compressed into sealing engagement against the relatively rotatable surface to define a hydrodynamic wedging angle with respect to the relatively rotatable surface, and to define an interfacial contact footprint of generally circular configuration but varying in width, being non-circular on the first footprint edge due to the aforementioned variations. The non-circular (i.e. wavy) first footprint edge hydrodynamically wedges a lubricating film of the first fluid into the interfacial contact footprint in response to a component of the relative rotational velocity, causing it to migrate toward the second footprint edge. The first footprint edge is sometimes referred to as the "lubricant side" or "hydrodynamic edge", and the second footprint edge is sometimes referred to as the "environment side" or "exclusion edge". The number and amplitude of the waves at the first footprint edge can vary as desired. The relatively rotatable surface can take any suitable form, such as an externally or internally oriented cylindrical surface, or a substantially planar surface, without departing from the spirit or scope of the invention.

The seal provides a dynamic exclusionary intersection of abrupt form that provides the interfacial contact footprint with a second footprint edge, sometimes called the "environment edge", that is substantially circular to prevent hydrodynamic wedging action and resist environmental exclusion. In the preferred embodiment, the dynamic exclusionary intersection is an intersection between the sloping dynamic sealing surface and the second seal end.

In the preferred embodiment, an energizer of a form common to the prior art having a modulus of elasticity different from the seal body, such as an elastomeric ring, a garter spring, a canted coil spring, or a cantilever spring, is provided to load the dynamic sealing lip against the relatively rotatable surface. In simplified embodiments, the energizer can be eliminated, such that the seal has one or more flexible lips, or such that the seal is solid and consists of a single material.

The second seal end is curved outward in a generally convex configuration in the uncompressed shape. When the seal is installed, the convex shape changes to a more straight configuration that helps to maintain contact pressure at the second edge of the interfacial contact footprint.

The generally circular body of the preferred seal embodiment defines a dynamic control surface and a static control surface near the first seal end that are in generally opposed relation to one another, and can react respectively against the relatively rotatable surface and the machine element to minimize undue twisting of the installed seal, which helps to maintain adequate interfacial contact pressure at the second footprint edge, thereby facilitating resistance to intrusion of abrasives that may be present in the second fluid.

The preferred seal cross-section defines a depth dimension from the sloping dynamic sealing surface to the sloping static sealing surface, and also defines a length dimension from the first seal end to second seal end. In the preferred embodiment of the present invention, the ratio of the length dimension divided by the depth dimension is preferred to be greater than 1.2 and ideally is in the range of about 1.4 to 1.6 to help minimize seal cross-sectional twisting.

The seal can be configured for dynamic sealing against a shaft, a bore, or a face. Simplified embodiments are possible wherein one or more features of the preferred embodiment are omitted.

It is one object of this invention to provide a hydrodynamic rotary seal having low torque and efficient exclusionary performance for reduced wear and heat generation. It is a further object to provide a seal that can operate with relatively high compression to better resist abrasives and tolerate runout, misalignment, tolerances, and compression set.

Another object is to compress a sloping dynamic sealing surface of a hydrodynamic seal against a relatively rotatable surface to establish an interfacial contact footprint, whereby more compression and interfacial contact pressure occurs at a second footprint edge, and less compression and interfacial contact pressure occurs at a first footprint edge.

BRIEF DESCRIPTION OF THE SEVERAL VIEWS OF THE DRAWING

So that the manner in which the above recited features, advantages, and objects of the present invention are attained and can be understood in detail, a more particular description of the invention, briefly summarized above, may be had by reference to the embodiments thereof which are illustrated in the appended drawings.

It is to be noted, however, that the appended drawings only illustrate typical embodiments of this invention, and are therefore not to be considered limiting of its scope, for the invention may admit to other equally effective embodiments.

In the Drawings:

Figure 1:
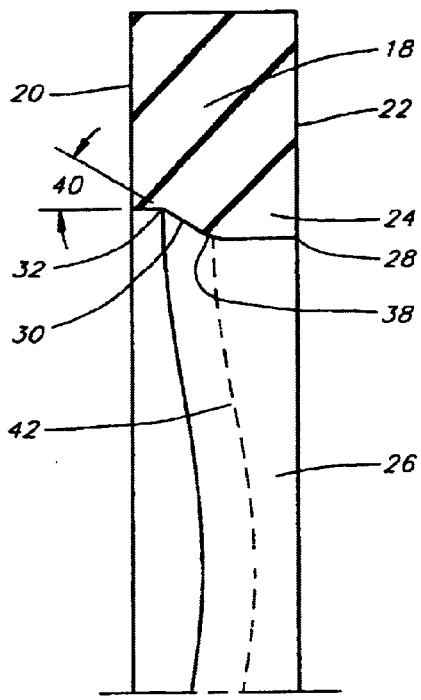
Figure 1A:
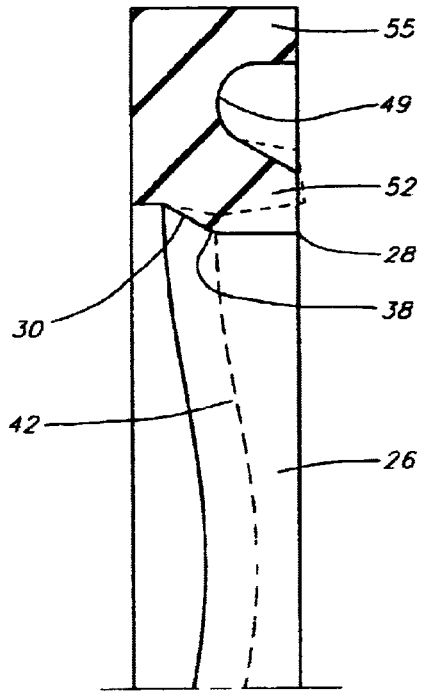

FIG. 1 is a sectional view of a hydrodynamic seal representing the prior art and embodying the subject matter of U.S. Pat. No. 4,610,319;

FIG. 1A is a sectional view of a hydrodynamic seal representing the prior art and embodying the subject matter of U.S. Pat. No. 5,678,829.

Figure 2:
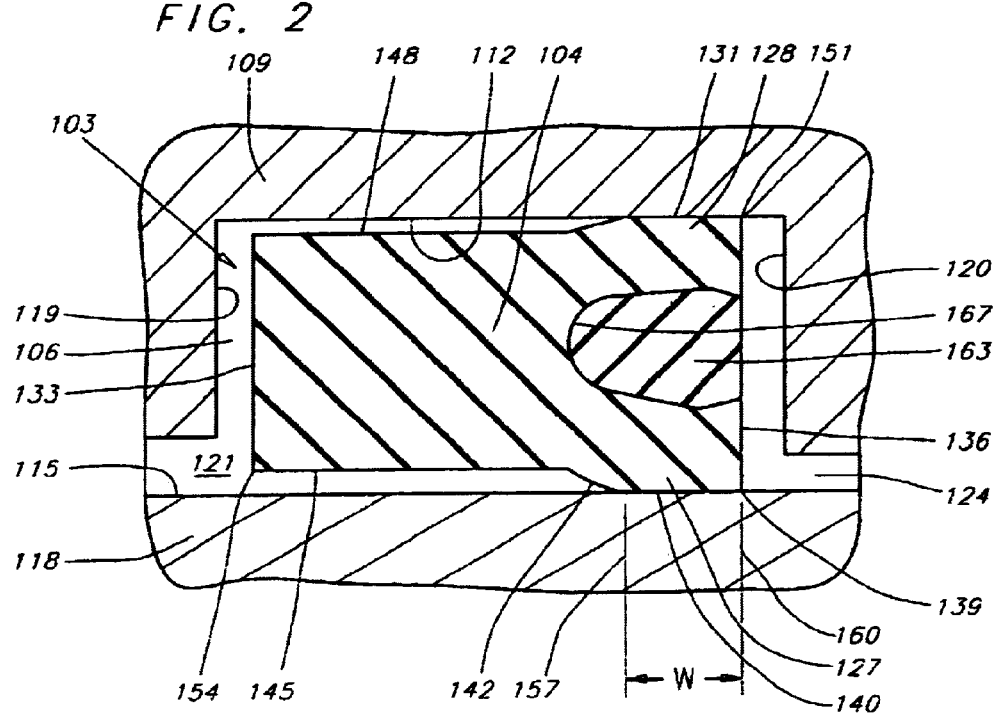
Figure 2A:
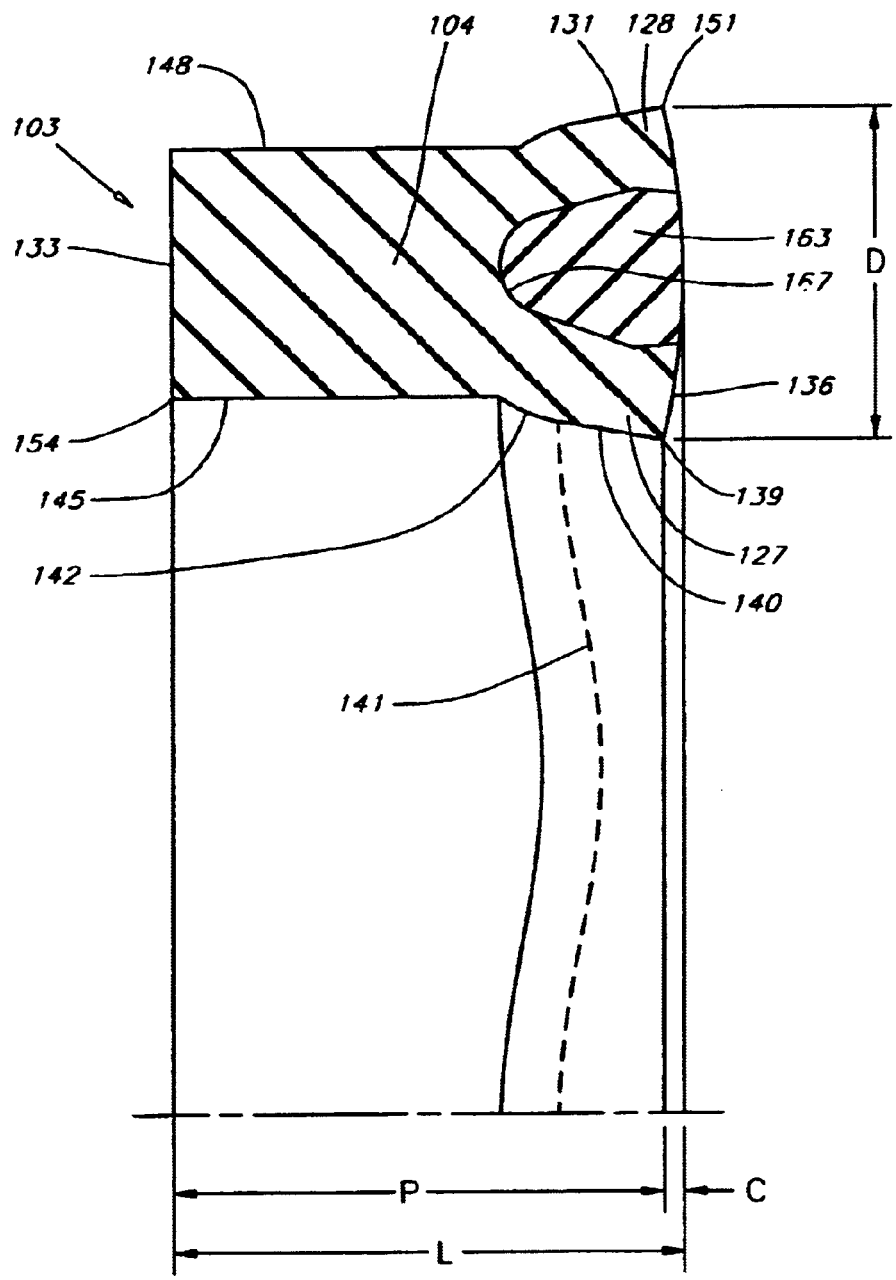
Figure 2B:
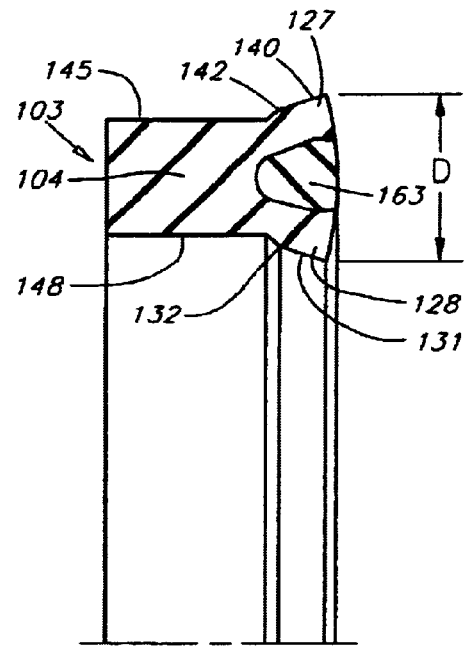
Figure 2C:
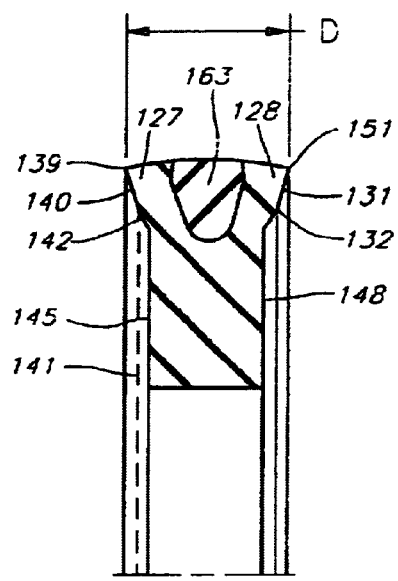
Figure 2D:
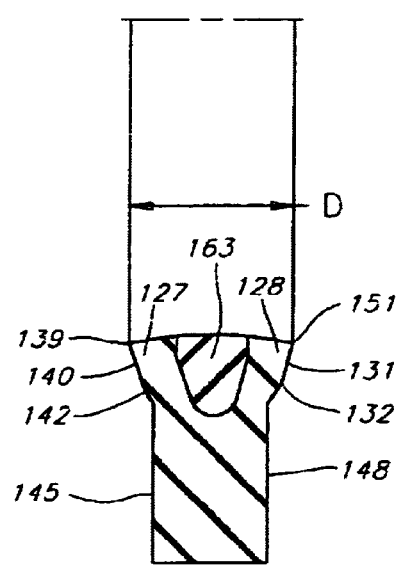
Figure 3:
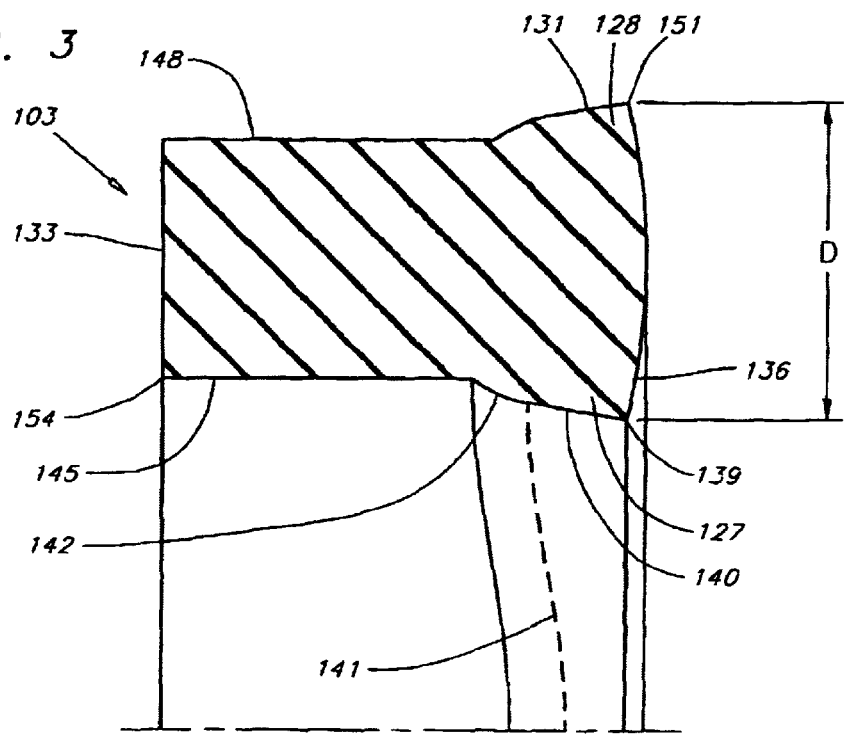
Figure 4:
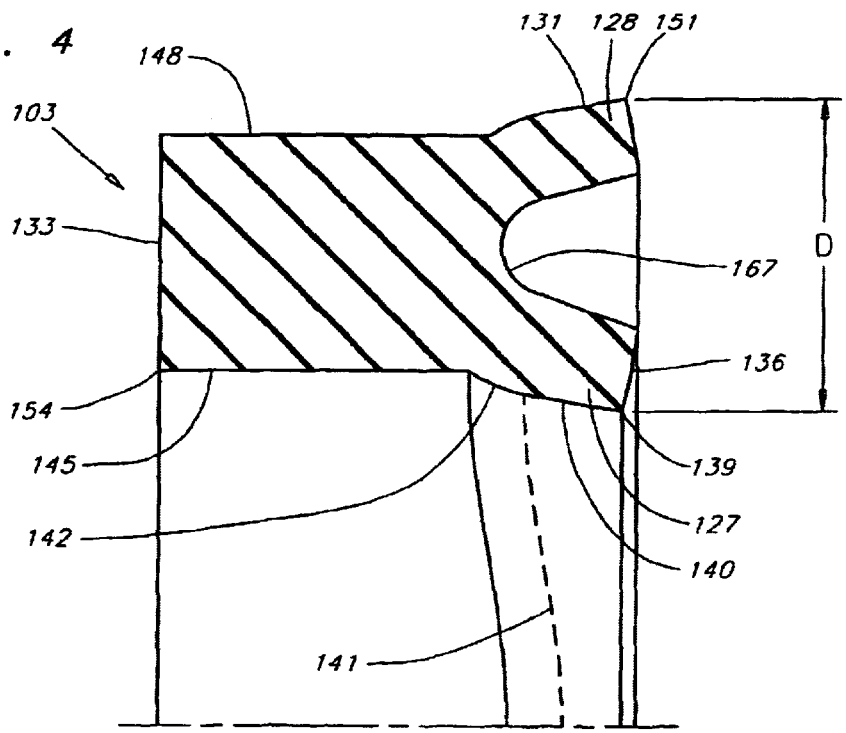

FIG. 2 is a fragmentary cross-sectional view representing the cross-sectional configuration of a ring shaped hydrodynamic seal embodying the principles of the present invention when located in a circular seal groove defined by a machine component and compressed against a relatively rotatable surface;

FIG. 2A is a fragmentary cross-sectional view of an uncompressed hydrodynamic seal embodying the principles of the present invention as configured for sealing against a relatively rotatable external cylindrical surface such as a shaft;

FIG. 2B is a fragmentary cross-sectional view of an uncompressed hydrodynamic seal embodying the principles of the present invention as configured for sealing against a relatively rotatable internal cylindrical surface;

FIG. 2C is a fragmentary cross-sectional view of an uncompressed hydrodynamic seal as configured for sealing against a relatively rotatable planar surface for applications where the seal lubricant is interior of the dynamic sealing lip;

FIG. 2D is a fragmentary cross-sectional view of an uncompressed hydrodynamic seal as configured for sealing against a relatively rotatable planar surface for applications where the seal lubricant is exterior to the dynamic sealing lip;

FIG. 3 is a fragmentary cross-sectional view of a simplification of the invention wherein the seal is solid and is constructed from a single material;

FIG. 4 is a fragmentary cross-sectional view of a simplification of the invention wherein the seal is constructed from a single material and defines flexible sealing lips;

FIG. 5 is a fragmentary cross-sectional view of an alternate embodiment of the invention wherein the seal incorporates an insertable resilient energizer;

FIG. 6 is a fragmentary cross-sectional view of an alternate embodiment of the invention wherein the seal incorporates a coil spring energizer;

FIG. 7 is a fragmentary cross-sectional view of an alternate embodiment of the invention wherein the seal incorporates a cantilever spring energizer;

FIG. 8 is a fragmentary cross-sectional view of an alternative embodiment of the invention wherein the seal incorporates a dynamic sealing lip made from a material having a predetermined modulus of elasticity and the energizer is made of a material having a modulus of elasticity that is less than that of the dynamic sealing lip;

FIG. 9 is a fragmentary cross-sectional view of an alternative embodiment of the invention wherein the dynamic control surface and the static control surface have been eliminated all the way back to the dynamic sealing lip and leaving the first end non-circular; and FIG. 10 is a fragmentary cross-sectional view of an alternative embodiment of the invention where two dynamic sealing lips are provided.

DETAILED DESCRIPTION OF THE INVENTION

FIGS. 2–2D represent the preferred embodiment of the present invention. FIG. 2 represents the cross-sectional configuration of the seal when installed. FIGS. 2A and 2B represent the uninstalled cross-sectional configuration of the preferred embodiment as configured for radial sealing. FIGS. 2C and 2D represent the uninstalled cross-sectional configuration of the preferred embodiment as configured for axial sealing. Features throughout this specification that are represented by like numbers have the same function. For orientation purposes, it should be understood that in the cross-sections of FIGS. 2–2D, and other figures herein, the cross-section of the respective cutting planes passes through the longitudinal axis of the seal.

In FIG. 2, a fragmentary transverse cross-sectional view is shown representing the cross-sectional configuration of the preferred embodiment of the hydrodynamic seal 103 of the present invention when located in and positioned by a circular seal groove 106 defined by a first machine component 109 (such as a housing) and compressed between groove counter-surface 112 of circular seal groove 106 and relatively rotatable surface 115 of a second machine component 118. This initiates a static sealing relationship with groove counter-surface 112 and relatively rotatable surface 115 in the same manner as any conventional interference type seal, such as an O-Ring. Groove counter-surface 112 and relatively rotatable surface 115 are in generally opposed relation to one-another. Machine component 109 and machine component 118 together typically define at least a portion of a chamber for locating a first fluid 121. The compressed configuration of the hydrodynamic seal 103 shown in FIG. 2 is representative of its shape when the pressure of first fluid 121 is substantially the same as the pressure of second fluid 124.

Circular seal groove 106 also preferably includes a first groove wall 119 and a second groove wall 120 that are in generally opposed relation to one another. In the hydrodynamic seal industry, first groove wall 119 is often referred to as the "lubricant-side gland wall", and second groove wall 120 is often referred to as the "environment-side gland wall". Although first groove wall 119 and second groove wall 120 are shown to be in fixed, permanent relation to one another, such is not intended to limit the scope of the invention, for the invention admits to other equally suitable forms. For example, first groove wall 119 and/or second groove wall 120 could be configured to be detachable from machine component 109 for ease of maintenance and repair, but then assembled in more or less fixed location for locating the seal.

Hydrodynamic seal 103, which is of generally ring-shaped configuration, has an annular seal body 104 that is used to partition the first fluid 121 from the second fluid 124, and to prevent intrusion of the second fluid 124 into the first fluid 121. The first fluid 121 is exploited in this invention to lubricate the dynamic sealing interface, and is preferably a liquid-type lubricant such as a synthetic or natural oil, although other fluids including greases, water, and various process fluids are also suitable for lubrication of the seal in some applications. The second fluid 124 may be any type of fluid desired, such as a lubricating media, a process media, an environment, etc. Relatively rotatable surface 115 can take the form of an externally or internally oriented substantially cylindrical surface, as desired, with hydrodynamic seal 103 compressed radially between groove counter-surface 112 and relatively rotatable surface 115. Alternatively, relatively rotatable surface 115 can take the form of a substantially planar surface, with hydrodynamic seal 103 compressed axially between a groove counter-surface 112 and relatively rotatable surface 115 of substantially planar form. Illustrations of the preferred embodiment as configured for radial compression are shown in FIGS. 2A and 2B. Illustrations of the preferred embodiment as configured for axial compression are shown in FIGS. 2C and 2D.

Hydrodynamic seal 103 incorporates a dynamic sealing lip 127 and a static sealing lip 128 that are of generally circular configuration, and in generally opposed relation to one another as shown, to minimize the potential for twisting of the seal within the gland. It is preferred that the uninstalled profile of the static sealing lip 128 mimic the average profile of the dynamic sealing lip 127 to provide a degree of compressive symmetry, although the overall projection of the two lips need not be identical.

Hydrodynamic seal 103 defines a sloping dynamic sealing surface 140 which is disposed in facing relation with the relatively rotatable surface 115, and which in the uncompressed condition, is sloped in regard to the relatively rotatable surface and hydrodynamic seal 103 also defines a hydrodynamic inlet curvature 142 for facing the relatively rotatable surface 115. Hydrodynamic inlet curvature 142 is preferred to be constant in curvature, but varies in position around the circumference of hydrodynamic seal 103, causing the width of sloping dynamic sealing surface 140 to vary. The slope of sloping dynamic sealing surface 140 is preferred to be constant around the circumference of hydrodynamic seal 103, and the cross-sectional profile of sloping dynamic sealing surface 140 can be any suitable shape, including straight or curved lines or line combinations. The blend location 141 between hydrodynamic inlet curvature 142 and sloping dynamic sealing surface 140 is represented by a dashed line in FIGS. 2A, 2C, and 3–10. In the preferred embodiment, blend location 141 is a location of tangency between hydrodynamic inlet curvature 142 and sloping dynamic sealing surface 140.

The non-circular, wavy positional variation of hydrodynamic inlet curvature 142 can take any form which is skewed with respect to the direction of relative rotation, and could take the form of one or more repetitive or non-repetitive convolutions/waves of any form including a sine, saw-tooth or square wave configuration, or plural straight or curved segments forming a tooth-like pattern, or one or more parabolic curves, cycloid curves, witch/versiera curves, elliptical curves, etc. or combinations thereof, including any of the design configurations shown in U.S. Pat. No. 4,610,319, and U.S. patent application Ser. No. 09/073,410.

Hydrodynamic seal 103 also defines sloping static sealing surface 131 which is generally circular and in generally opposed relation to sloping dynamic sealing surface 140 and which, in the noncompressed condition thereof, is of sloped configuration. A static exclusionary intersection 151 is preferably provided at the intersection between second seal end 136 and sloping static sealing surface 131 for excluding the second fluid 124. Both sloping dynamic sealing surface 140 and sloping static sealing surface 131 are angulated with respect to the respective mating surfaces of the machine components 118 and 109. The sloping static sealing surface 131 defines a lubricant side edge 132 and an environment side edge which is established by a static exclusionary intersection 151.

The cross-section of hydrodynamic seal 103 defines an annular seal body 104 having a first seal end 133 for facing the first groove wall 119 shown in FIG. 2 and also defines a second seal end 136 for facing second groove wall 120 shown in FIG. 2. In the hydrodynamic seal industry, first seal end 133 is often referred to as the "lubricant end", and second seal end 136 is often referred to as the "environment-end". The first seal end 133 of the seal cross-section is preferred to be in generally opposed relation to the second seal end, and it is preferred that the second seal end 136 be curved outward as shown in a generally convex shape, in the uninstalled condition. The generally convex shape can consist of one or more curves, or can be approximated by straight lines. Installation of hydrodynamic seal 103 compresses dynamic sealing lip 127 against the relatively rotatable surface 115 and establishes an interfacial contact footprint of generally circular form and having a width dimension W which varies in size about the circumference of hydrodynamic seal 103. Sloping dynamic sealing surface 140, in the preferred embodiment, extends in sloping fashion from dynamic exclusionary intersection 139 to hydrodynamic inlet curvature 142, and can be comprised of any suitable sloping shape or combination of sloping shapes as desired, including straight and curved shapes. The geometry of hydrodynamic inlet curvature 142 can take any suitable design configuration that results in a gradually converging, non-circular geometry for promoting hydrodynamic wedging without departing from the spirit or scope of the present invention, including any type of curve, such as but not limited to a radius, a portion of an ellipse, a portion of a sine wave curve, a portion of a parabolic curve, a portion of a cycloid curve, a portion of witch/versiera curves, or combinations thereof, etc.

The annular seal body 104 of hydrodynamic seal 103 defines a dynamic control surface 145 for facing the relatively rotatable surface 115 that is shown in FIG. 2, and also defines a static control surface 148 for facing the groove counter-surface 112 that is shown in FIG. 2. Dynamic control surface 145 cooperates with the relatively rotatable surface and static control surface 148 cooperates with the circular seal groove to prevent undue twisting of the installed seal within the seal groove.

Hydrodynamic seal 103 defines a depth dimension D from sloping static sealing surface 131 to sloping dynamic sealing surface 140, and also defines a Length dimension L from first seal end 133 to second seal end 136. Dynamic exclusionary intersection 139 is preferably an abrupt exclusionary geometry adapted to be exposed to the second fluid 124 for excluding intrusion of second fluid 124. Dynamic exclusionary intersection 139 is located by a positional dimension P from body intersection 154. Length dimension L and positional dimension P are preferred to be constant about the circumference of hydrodynamic seal 103. In the preferred embodiment, owing to the preferred curvature of second seal end 136, positional dimension P is less than Length dimension L, however it is understood that these dimensions could be substantially equal if the uninstalled curvature of second seal end 136 is small or substantially absent.

When relative rotation is absent, a liquid tight static sealing relationship is maintained at the interface between static sealing lip 128 and groove counter-surface 112, and at the interface between dynamic sealing lip 127 and relatively rotatable surface 115. When relative rotation occurs between circular seal groove 106 and relatively rotatable surface 115, the hydrodynamic seal 103 remains stationary with respect to groove counter-surface 112 and maintains a static sealing relationship therewith, while the interface between dynamic sealing lip 127 and relatively rotatable surface 115 becomes a dynamic sealing interface such that relatively rotatable surface 115 slips with respect to dynamic sealing lip 127 at a given rotational velocity "V". The relative rotation direction is normal (perpendicular) to the plane of the cross-section depicted in FIG. 2.

In the installed condition, dynamic sealing lip 127 deforms to establish an interfacial contact footprint against relatively rotatable surface 115. This footprint has a width dimension W (see FIG. 2) that varies in size about the circumference of hydrodynamic seal 103 due to the positional variation of the hydrodynamic inlet curvature 142. The first footprint edge 157 of the interfacial contact footprint is non-circular; i.e. wavy, due to the positional variation of the hydrodynamic inlet curvature 142 and, in conjunction with the deformed shape of dynamic sealing lip 127, produces a hydrodynamic wedging action in response to relative rotation between the hydrodynamic seal 103 and the relatively rotatable surface 115. This hydrodynamic wedging action wedges a film of lubricating fluid (i.e. first fluid 121) into the interfacial contact footprint between the dynamic sealing lip 127 and the relatively rotatable surface 15 for lubrication purposes, which reduces wear, torque and heat generation.

The first footprint edge 157 will be shaped in a wave pattern similar to the wave pattern of blend location 141, but may occur on either the left or right side of blend location 141, depending on the magnitude of seal compression, swelling and thermal expansion; etc. It can be appreciated that if the first footprint edge 157 occurs on the sloping dynamic sealing surface 140, the resulting hydrodynamic wedging angle will be more efficient than if the first footprint edge 157 occurs on the hydrodynamic inlet curvature 142. It can also be appreciated that the hydrodynamic inlet curvature 142 helps to limit the ultimate width that the interfacial contact footprint can achieve, and therefore helps to mitigate the effects that compression variations, swelling, thermal expansion, etc. have on footprint width dimension W.

The number and amplitude of the waves at the first footprint edge 157 can be varied to achieve the desired hydrodynamic lubricant film thickness by varying the wave number and amplitude of the wavy positional variation of hydrodynamic inlet curvature 142. The general interfacial contact footprint shape (wavy on one side, circular on the other) is in accordance with the teachings of U.S. Pat. No. 4,610,319, but the interfacial contact pressure profile that is achieved with the sloping surfaces of the present invention is far superior, as is the exclusionary performance of the seal.

The second footprint edge 160 (sometimes called the "environment edge") of the interfacial contact footprint is substantially circular, and therefore does not produce a hydrodynamic wedging action in response to relative rotation between the hydrodynamic seal 103 and the relatively rotatable surface 115, thereby facilitating exclusion of second fluid 124.

Owing to the angled nature of sloping dynamic sealing surface 140 and sloping static sealing surface 131, when hydrodynamic seal 103 is installed, more compression occurs at the second footprint edge 160 of the interfacial contact footprint (where more compression is desirable to compensate for abrasive wear resulting from exposure to any abrasives that may be present in the second fluid 124) and less compression occurs at the first footprint edge 157 of the interfacial contact footprint. This means that interfacial contact pressure within the interfacial contact footprint between the dynamic sealing lip 127 and the relatively rotatable surface 115 can easily be engineered to be less at first footprint edge 157 and significantly greater at second footprint edge 160.

The preferably abrupt angle of convergence at dynamic exclusionary intersection 139 provides a rapid rise in contact pressure at the second footprint edge 160. Compression of sealing material in compressive region C (which in the uninstalled state overhangs past dynamic exclusionary intersection 139) further adds to the magnitude of interfacial contact pressure near second footprint edge 160, and therefore enhances exclusionary performance.

As noted previously, the installed shape of the environment end of prior art seals becomes somewhat concave in the absence of pressure, particularly at high levels of compression. This reduces environment-edge interfacial contact pressure, and reduces exclusionary performance. In the present invention, this problem is addressed by making the second seal end 136 of the cross-section generally convex, so that when hydrodynamic seal 103 is installed, the second seal end 136 becomes approximately straight. The compressive reaction caused by the angle of sloping dynamic sealing surface 140 and sloping static sealing surface 131 tends to exaggerate the formation of a concave second seal end 136 under compression unless this tendency is addressed by implementing the convex end shape shown.

Because the seal of the present invention has high levels of compression and contact pressure near the second footprint edge 160, it resists intrusion of the second fluid 124, and provides dimensionally more material to sacrifice to abrasion, allowing long service life in the presence of abrasives within second fluid 124. The high compression also helps to make the seal tolerant of runout, misalignment, tolerances, and compression set.

It has previously been mentioned that the present invention is suitable for both radial compression arrangements and axial compression arrangements. In the case of very large diameter seals, sloping dynamic sealing surface 140 and dynamic control surface 145 can simply be manufactured as a generally internally oriented surfaces, with sloping dynamic sealing surface 140 configured for sealing against a relatively rotatable surface 115 defining an externally oriented cylindrical surface. The cross-section of large diameter seals can be rotated 90 degrees so that sloping dynamic sealing surface 140 becomes a generally axially oriented surface configured for sealing against a relatively rotatable surface 115 of substantially planar form, or can be rotated 180 degrees so that sloping dynamic sealing surface 140 becomes an externally oriented surface configured for sealing against a relatively rotatable surface 115 defining an internally oriented cylindrical surface. The relative torsional stiffness of small diameter seals is much higher, and for small seals the sloping dynamic sealing surface 140 should be pre-oriented in the desired configuration at the time of manufacture.

Radial compression of seals not only causes radial compression, but also causes a certain amount of circumferential compression that can cause unpressurized seals to twist and skew (i.e. snake) within the gland. In such cases, the sealing slip "sweeps" the shaft, causing environmental impingement and seal wear. Circumferential compression-induced skewing is in part related to what proportion of the seal is being initially compressed, the magnitude of compression, how stiff the cross-section is proportional to the diameter, and how the thermal expansion of the seal is constrained.

In the preferred embodiment shown, when used in radial compression, only a relatively small percentage of the seal body is subject to compression between relatively rotatable surface 115 and groove counter-surface 112, therefore in radial compression applications, only a relatively small portion of the seal is circumferentially compressed. A much larger portion of the seal is not circumferentially compressed, and therefore serves to inhibit circumferential compression-induced skewing. Further, the construction of the seal, owing to the longer than usual length dimension L, is relatively stiff compared to prior art seals, which helps to inhibit local buckling-induced skew.

In the preferred embodiment of the present invention, the ratio of length dimension L divided by depth dimension D is preferred to be greater than 1.2 and ideally is in the range of about 1.4 to 1.6. Many styles of prior art seals are prone to significantly reduced interfacial contact pressure near second footprint edge 160 upon torsional twisting of the seal cross-section within the seal groove. In the preferred embodiment of the present invention, owing to the ratio of length dimension L divided by depth dimension D, the dynamic control surface 145 will contact relatively rotatable surface 115 to prevent further cross-sectional twisting before a significant reduction in interfacial contact pressure near second footprint edge 160 can occur.

In the prior art seals, interfacial contact pressure at the environment edge of the footprint varied in time with the waves. In the preferred embodiment of the present invention, as the width dimension W of the interfacial contact footprint changes locally due to the varying position of the hydrodynamic inlet curvature 142, the interfacial contact pressure at the second footprint edge 160 remains more constant because the depth dimension D of the seal can be engineered to vary locally in time with the width dimension W to even out the contact pressure variations around the circumference of the seal. If depth dimension D is made to vary, either static exclusionary intersection 151 or dynamic exclusionary intersection 139 (or both) must necessarily be non-circular in the uninstalled condition of the seal. A molding flash line is typically located at both static exclusionary intersection 151 and dynamic exclusionary intersection 139. Non-circularity caused by variations in depth dimension D affects the accuracy of flash trimming operations. Since dynamic exclusionary intersection 139 defines the second footprint edge 160 of the interfacial contact footprint, which is desired to be circular for optimum exclusion resistance, it is preferred that dynamic exclusionary intersection 139 be manufactured circular to maximize the accuracy of flash removal operations at that location. Therefore it is preferred that for any embodiment herein where depth dimension D varies, the static exclusionary intersection 151 be made non-circular, since any inaccuracy in flash removal operations at that location has minimal effect on seal performance. It can be appreciated, however, that in applications where no flash line exists at dynamic exclusionary intersection 139, that intersection can be made non-circular as a result of variations in depth dimension D, yet when it is installed against a relatively rotatable surface, the resulting second footprint edge 160 will be substantially circular.

The dynamic sealing lip 127 is constructed of a sealing material selected for its wear and extrusion resistance characteristics, and has a predetermined modulus of elasticity. In the preferred embodiment of the present invention, an energizer 163 is provided to load sloping dynamic sealing surface 140 against relatively rotatable surface 115 and to load sloping static sealing surface 131 against groove counter-surface 112. The energizer 163 can take any of a number of suitable forms known in the art, including various forms of springs without departing from the scope or spirit of the invention, as will be discussed later. The annular recess 167 can also be of any suitable form.

As shown in FIGS. 2–2D, energizer 163 can be a resilient material that has a modulus of elasticity which may be different than the predetermined modulus of elasticity of the dynamic sealing lip 127. For example, the modulus of elasticity of energizer 163 could be lower than the predetermined modulus of elasticity of dynamic sealing lip 127 in order to manage interfacial contact pressure to optimum levels for lubrication and low torque. Energizer 163 may be bonded to or integrally molded with the rest of the seal to form a composite structure, or can be simply be a separate piece mechanically assembled to the rest of the seal. Other suitable types of energizers are shown in subsequent figures. The energizer 163 shown in the various figures herein can be of any of the various types of energizer discussed herein without departing from the spirit or scope of the invention. The hydrodynamic seal 103 of FIGS. 2–2D is illustrated as a compression-type seal, but can be converted to a flexing lip type seal by elimination of the energizer 163, as can the other seal figures herein that illustrate an energizer 163 that is contained within an annular recess 167.

FIGS. 2A–2D show that the basic concept of the preferred embodiment can be configured for dynamic sealing against a shaft, a bore, or a face without departing from the spirit or essence of the invention.

FIG. 2A is a fragmentary cross-sectional view of uninstalled hydrodynamic seal 103 for being compressed in a radial direction for sealing against a relatively rotatable surface of external cylindrical form, such as a the exterior surface of a shaft. Sloping dynamic sealing surface 140, hydrodynamic inlet curvature 142 and dynamic control surface 145 are generally internally oriented surfaces, with sloping dynamic sealing surface 140 configured for sealing against an external cylinder.

FIG. 2B is a fragmentary cross-sectional view of uninstalled hydrodynamic seal 103 as configured for being compressed in a radial direction for sealing against a relatively rotatable surface of internal cylindrical form, such as a bore. Sloping dynamic sealing surface 140, hydrodynamic inlet curvature 142 and dynamic control surface 145 are externally oriented surfaces, with sloping dynamic sealing surface 140 configured for sealing against a bore.

FIGS. 2C and 2D are fragmentary cross-sectional views of uninstalled hydrodynamic seal 103 as configured for being compressed in a an axial direction for sealing against a relatively rotatable surface of substantially planar form, and clearly illustrate that the present invention may be also used in a face-sealing arrangements. Sloping dynamic sealing surface 140, hydrodynamic inlet curvature 142 and dynamic control surface 145 are generally axially oriented surfaces, with sloping dynamic sealing surface 140 configured for sealing against a face. In FIG. 2C the sloping dynamic sealing surface 140, hydrodynamic inlet curvature 142 and dynamic exclusionary intersection 139 are positioned for having the first fluid 121, i.e. a lubricating fluid, toward the inside of the seal, and in FIG. 2D they are positioned for having the first fluid 121 toward the outside of the seal.

Though the preferred embodiment of FIGS. 2–2D incorporates a dynamic sealing lip made from one material, and an energizer made from another material, such is not intended to limit the present invention in any manner whatever. It is intended that the seal of the present invention may incorporate one or more seal materials or components without departing from the spirit or scope of the invention.

In FIG. 3, the energizing section of the preferred embodiment has been eliminated by simply constructing the seal as a solid, generally circular seal composed of resilient sealing material, such as an elastomer. This results in simplified manufacture and lower cost, and potentially better dimensional accuracy at depth dimension D.

In FIG. 4, the energizing section of the preferred embodiment has been eliminated, leaving a void in the form of an annular recess 167 where the energizing section would otherwise be, and the resulting seal is of the flexing-lip type. Annular recess 167 defines dynamic sealing lip 127 and static sealing lip 128 to be of the flexing lip variety. The seal of FIG. 4 is superior in abrasion resistance, compared to the seals disclosed in U.S. Pat. No. 5,678,829, because of the slope of sloping dynamic sealing surface 140 prevents the lifting/propping of the circular exclusionary geometry that occurs in the prior art seals disclosed in U.S. Pat. No. 5,678,829. The flexible lip construction permits the use of relatively high modulus materials that would otherwise be unsuitable for use in a solid (ungrooved) seal due to the high interfacial contact pressure that would result.

The contact pressure at the interface between the dynamic sealing lip 127 and the mating relatively rotatable surface is one of several important factors controlling hydrodynamic performance because it directly influences hydrodynamic film thickness, which in turn influences the shear rate of the lubricant film and the amount of asperity contact, if any, between the seal and shaft, and therefore influences the magnitude of heat generated at the dynamic interface. Management of interfacial contact pressure is particularly important in applications where the pressure of the environment is higher than the pressure of the lubricant.

The flexing lip construction of dynamic sealing lip 127 relieves some of the contact pressure at the interface between the dynamic sealing lip 127 and the relatively rotatable surface that would otherwise occur if the seal were of the direct compression type (such as the seal of FIG. 3), thereby helping to assure sufficient hydrodynamic lubrication.

The seal of FIG. 4 may be composed of any suitable sealing material, including elastomeric or rubber-like materials and various polymeric materials, and including different materials bonded together to form a composite structure; however it is preferred that dynamic sealing lip 127 be made from a reinforced material, such as multiple ply fabric reinforced elastomer.

In FIG. 5, the dynamic sealing lip 127 and the static sealing lip 128 are made from a first material having a predetermined modulus of elasticity, and the energizer 163 is made from a second material having a modulus of elasticity that is less than that used to form the dynamic sealing lip 127 and the static sealing lip 128. The energizer 163 takes the form of an insertable annular member, such as but not limited to an O-Ring, that is installed into annular recess 167.

In FIGS. 6 and 7, the dynamic sealing lip 127 and the static sealing lip 128 are made from a sealing material having a predetermined modulus of elasticity, and the energizer 163 is a spring having a modulus of elasticity that is greater than that used to form the dynamic sealing lip 127 and the static sealing lip 128. In FIG. 6 the energizer 163 is a conventional seal-lip energizing coil spring, such as a canted coil spring or a garter spring, and in FIG. 7 the energizer 163 is a conventional seal-lip energizing cantilever spring-type member. Springs are highly desirable for use as energizers in hydrodynamic seals because their high modulus of elasticity allows them to cause the dynamic sealing lip 127 to follow relatively high levels of shaft deflection and runout, and because they are more resistant to high temperature compression set, compared to many elastomeric energizers.

In FIG. 8, the dynamic sealing lip 127 is made from a first resilient material layer having a predetermined modulus of elasticity, and the energizer 163 is made from a second material layer having a modulus of elasticity that is typically less than that used to form the dynamic sealing lip 127. For example, a 40–80 durometer Shore A elastomer could be used to form the energizer 163, and a resilient material having a hardness greater than 80 durometer shore A could be used to form the dynamic sealing lip 127. Thus the extrusion resistance at the dynamic sealing lip 127 is controlled by its modulus of elasticity, but its interfacial contact pressure is controlled by the modulus of elasticity of the energizer 163. This provides good extrusion resistance, and relatively low breakout torque and running torque. The low running torque minimizes running temperature, which moderates temperature related seal degradation. The second seal end 136 is preferred to be convex in the uninstalled condition. In FIG. 6, the energizer 163 comprises the majority of the seal, so that the interfacial contact pressure is not dictated by the relatively higher modulus material of the dynamic sealing lip 127. The material interface between the material forming the dynamic sealing lip 127 and the energizer 163 can be of any suitable form.

It is widely understood that the higher the modulus of elasticity of the sealing material, the more resistant the seal is to high-pressure extrusion damage. In the seal of FIG. 8, and the seals of other figures herein which employ an energizer having a lower modulus of elasticity compared to the material of the dynamic sealing lip, the dynamic sealing lip is preferred to be constructed from a hard, relatively high modulus extrusion resistant material such as a flexible polymeric material, a high modulus elastomer such as one having a durometer hardness in the range of 80–97 Shore A, or a fabric, fiber or metal reinforced elastomer, or a high performance temperature-resistant plastic.

It can be appreciated that benefits other than extrusion resistance and lowered torque can be provided by the dual material construction of the seals illustrated in this specification that employ an energizer. For example, it would be useful to employ a TFEP material to construct the dynamic sealing lip 127 in order to exploit it's excellent high temperature crack and abrasion resistance, then use a more compression set resistant material such as FKM or silicone to form the energizer 163 in order to compensate for the poor compression set resistance of the TFEP.

In the seals of FIGS. 2–8, dynamic control surface 145 and static control surface 148 of annular seal body 104 are preferably provided to prevent undue twisting of the installed seal within the seal groove. In FIG. 9 the dynamic control surface and the static control surface have been eliminated all the way back to the dynamic sealing lip 127 as a simplification, leaving the first seal end 133 wavy; i.e. non-circular. This arrangement is particularly suitable for applications where the pressure of the second fluid is higher than the pressure of the first fluid, or for applications that require the use of materials having poor compression set, such as TFEP, where spring loading can be employed to help to compensate for compression set of the seal material. To best exploit the seal of FIG. 9, the first groove wall can be made in a wavy, non-circular shape corresponding to the wavy shape of first seal end 133. If the first groove wall is made wavy so that it inter-fits with, and supports the wavy shape of first seal end 133, then forces acting against either first seal end 133 or second seal end 136 cannot completely flatten hydrodynamic inlet curvature 142 against the relatively rotatable surface, thereby preserving an efficient, gently converging hydrodynamic wedging angle between hydrodynamic inlet curvature 142 and the relatively rotatable surface for maintaining efficient hydrodynamic film lubrication of sloping dynamic sealing surface 140. This makes the seal run much cooler than comparable non-hydrodynamic seals, therefore the seal retains a relatively high modulus of elasticity for optimum extrusion resistance. If the first groove wall is made wavy so that it inter-fits with, and supports the wavy shape of first seal end 133 dynamic exclusionary intersection 139 is maintained in the intended substantially circular configuration for efficient environmental exclusion, despite forces acting against second seal end 136 that, in the prior art, compromise the performance of such exclusionary intersections.

In conditions of differential pressure acting from the direction of the second end 136, the wavy shape of the first groove wall supports the seal against the distorting effect of the pressure of the second fluid to maintain the functional integrity of the hydrodynamic inlet curvature 142 and the dynamic exclusionary intersection 139. In applications where high compression set sealing materials such as TFEP must be used in conjunction with spring force to negate some of the compression set, the wavy shape of the first groove wall maintains the wavy positional variations of the hydrodynamic inlet curvature 142 despite the poor compression set resistance of the material.

The seal of FIG. 9 may be composed of any suitable sealing material, including elastomeric or rubber-like materials and various polymeric materials, and including different materials bonded together to form a composite structure or inter-fitted together; however it is preferred that the portion of the seal defining dynamic sealing lip 127 be made from a reinforced material, such as multiple ply fabric reinforced elastomer having at least some of the plies substantially aligned with sloping dynamic sealing surface 140.

The fragmentary transverse cross-sectional views of FIG. 10 shows that the variable hydrodynamic geometry can be on both sealing lips, rather than having a static sealing lip and a dynamic sealing lip. This allows the seal to slip in a hydrodynamically lubricated mode with either the relatively rotatable surface, the seal groove, or both.

In FIG. 10, two dynamic sealing lips are provided; first dynamic lip 127A and second dynamic lip 127B and they define respective first and second sloping dynamic sealing surfaces 140A and 140B.

When the seal of FIG. 10 is installed between a relatively rotatable surface and a circular seal groove, both of the first and second dynamic lips 127A and 127B establish variable width interfacial contact footprints with their respective counter-surfaces, wherein the width dimension of each footprint varies in size about the circumference of the seal.

When the seal of FIG. 10 is installed, the first footprint edge of each of the interfacial contact footprints is non-circular; i.e. wavy, and in conjunction with the deformed shape of the seal, produces a hydrodynamic wedging action in response to any relative rotation between the seal and the respective counter-surfaces of the seal groove and the relatively rotatable surface.

Although FIGS. 3–10 show seals for sealing against an external cylindrical surface, the basic cross-sectional configurations are equally suitable for being oriented for face sealing, or for sealing against an internal cylindrical surface.

The basic sealing elements shown herein (exclusive of the energizers which are discussed separately) may be composed of any of a number of suitable materials, or combinations thereof, including elastomeric or rubber-like sealing material and various polymeric sealing materials.

As with the preferred embodiment, for all of the seals illustrated in the figures herein, the depth dimension D may if desired vary in time with the varying position of the hydrodynamic inlet curvature (and the resulting variation in width dimension W of the interfacial contact footprint) to help even out interfacial contact pressure variations around the circumference of the seal.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A hydrodynamic seal (103) for sealing between a first machine component (109) and a relatively rotatable surface (115) of a second machine component (118) and for serving as a partition between a first fluid (121) and a second fluid (124) and preventing intrusion of the second fluid (124) into the first fluid (121), comprising:
   A. an annular seal body (104) having a first seal end (133) and a second seal end (136);
   B. an annular static sealing lip (128) defining an annular sloping static sealing surface (131) establishing compressed sealing relation with the first machine component (109);
   C. an annular dynamic sealing lip (127) in generally opposed relation to said annular static sealing lip (128) and defining:
      i. a sloping dynamic sealing surface (140) of generally annular form and having variable width and being for establishing compressed sealing relation with the relatively rotatable surface (115);
      ii. a hydrodynamic inlet curvature (142) that varies in position relative to said second seal end (136) to form one or more waves for providing hydrodynamic wedging action in response to relative rotation;
      iii. a dynamic exclusionary intersection (139) of substantially abrupt form for facing and preventing intrusion of the second fluid (124); and
      iv. said sloping dynamic sealing surface (140) being located between said hydrodynamic inlet curvature (142) and said dynamic exclusionary intersection (139).

2. The hydrodynamic seal (103) of claim 1, comprising:
   at least one energizer (163) of generally circular form for loading said sloping dynamic sealing surface (140) into compressed sealing relation with the relatively rotatable surface (115).

3. The hydrodynamic seal (103) of claim 2, comprising:
   said at least one energizer (163) being an elastomeric ring.

4. The hydrodynamic seal (103) of claim 2, comprising:
   said at least one energizer (163) being at least one cantilever-type spring.

5. The hydrodynamic seal (103) of claim 2, comprising:
   said at least one energizer (163) being a canted coil spring.

6. The hydrodynamic seal (103) of claim 2, comprising:
   said at least one energizer (163) being a garter coil spring.

7. The hydrodynamic seal (103) of claim 2, comprising:
   said at least one energizer (163) being located between said annular dynamic sealing lip (127) and said annular static sealing lip (128).

8. The hydrodynamic seal (103) of claim 2, comprising:
   said at least one energizer (163) defining said annular static sealing lip (128).

9. The hydrodynamic seal (103) of claim 2, comprising:
   said at least one energizer (163) having a modulus of elasticity less than the modulus of elasticity of said annular seal body (104).

10. The hydrodynamic seal (103) of claim 2, comprising:
    said at least one energizer (163) having a modulus of elasticity greater than the modulus of elasticity of said annular seal body (104).

11. The hydrodynamic seal (103) of claim 1, comprising:

said dynamic exclusionary intersection (139) being an intersection between said sloping dynamic sealing surface (140) and said second seal end (136).

12. The hydrodynamic seal (103) of claim 1, comprising:
said second seal end (136) projecting outward in a generally convex configuration in the uncompressed condition thereof.

13. The hydrodynamic seal (103) of claim 1, wherein:
A. said annular seal body (104) defining a depth dimension (D) from said annular sloping static sealing surface (131) to said sloping dynamic sealing surface (140);
B. said annular seal body (104) defining a length dimension (L) from said first seal end (133) to said second seal end (136);
C. the ratio of said length dimension (L) divided by said depth dimension (D) being greater than 1.2;
D. said annular seal body (104) defining a dynamic control surface (145) facing the relatively rotatable surface (115) and resisting cross-sectional twisting of said annular seal body (104);
E. said annular seal body (104) defining a static control surface (148) facing the first machine component (109) and resisting cross-sectional twisting of said annular seal body (104); and
F. said dynamic control surface (145) and said static control surface (148) being in generally oppositely oriented relation to one another.

14. The hydrodynamic seal (103) of claim 1, wherein:
A. said annular seal body (104) defining a depth dimension (D) from said annular sloping static sealing surface (131) to said sloping dynamic sealing surface (140);
B. said annular seal body (104) defining a length dimension (L) from said first seal end (133) to said second seal end (136);
C. the ratio of said length dimension (L) divided by said depth dimension (D) being in the range of 1.4 to 1.6;
D. said annular seal body (104) defining a dynamic control surface (145) facing the relatively rotatable surface (115) and resisting cross-sectional twisting of said annular seal body (104);
E. said annular seal body (104) defining a static control surface (148) facing the first machine component (109) and resisting cross-sectional twisting of said annular seal body (104); and
F. said dynamic control surface (145) and said static control surface (148) being in generally oppositely oriented relation to one another.

15. The hydrodynamic seal (103) of claim 1, wherein:
A. said annular seal body (104) defining a depth dimension (D) from said annular sloping static sealing surface (131) to said sloping dynamic sealing surface (140); and
B. the magnitude of said depth dimension (D) varying substantially in time with said position of said hydrodynamic inlet curvature (142).

16. The hydrodynamic seal (103) of claim 1, wherein:
said second seal end (136) defining an annular recess (167) intermediate said annular dynamic sealing lip (127) and said annular static sealing lip (128).

17. The hydrodynamic seal (103) of claim 1, wherein:
said first seal end (133) varying in position relative to said second seal end (136) and substantially in time with said position of said hydrodynamic inlet curvature (142).

18. The hydrodynamic seal (103) of claim 1, wherein:
said annular seal body (104) being solid in cross-section.

19. The hydrodynamic seal (103) of claim 1, wherein:
A. said annular dynamic sealing lip (127) projecting radially inward from said annular seal body (104); and
B. said annular static sealing lip (128) projecting radially outward from said annular seal body (104).

20. The hydrodynamic seal (103) of claim 1, wherein:
A. said annular dynamic sealing lip (127) projecting radially outward from said annular seal body (104); and
B. said annular static sealing lip (128) projecting radially inward from said annular seal body (104).

21. The hydrodynamic seal (103) of claim 1, wherein:
said annular dynamic sealing lip (127) and said annular static sealing lip (128) both projecting axially from said annular seal body (104).

22. A hydrodynamic seal (103) for sealing between a first machine component (109) and a relatively rotatable surface (115) and for serving as a partition between a first fluid (121) and a second fluid (124) and preventing intrusion of the second fluid (124) into the first fluid (121), comprising:
A. an annular seal body (104) having a first seal end (133) and a second seal end (136);
B. a first annular dynamic sealing lip (127A) for establishing compressed sealing relation with the relatively rotatable surface (115) and defining:
  i. a first dynamic sealing surface (140A) of generally annular form and having variable width and being for establishing compressed dynamic sealing relation and a first dynamic sealing interface with the relatively rotatable surface (115);
  ii. a first hydrodynamic inlet curvature (142A) that varies in position relative to said second seal end (136) to form one or more waves for providing hydrodynamic wedging action in response to relative rotation of said first dynamic sealing surface (140A) and the relatively rotatable surface (115); and
  iii. a first dynamic exclusionary intersection (139A) of substantially abrupt form being in contact with the relatively rotatable surface (115) and facing and preventing intrusion of the second fluid (124) into the first fluid (121);
C. a second annular dynamic sealing lip (127B) in generally opposed relation to said first annular dynamic sealing lip (127A) for establishing compressed dynamic sealing relation with the first machine component (109) and defining:
  i. a second dynamic sealing surface (140B) of generally annular form being disposed in generally opposed relation with said first dynamic sealing surface (140A) and having variable width and being for establishing compressed dynamic sealing relation and a second dynamic sealing interface with the first machine component (109);
  ii. a second hydrodynamic inlet curvature (142B) that varies in position relative to said second seal end (136) to form one or more waves for providing hydrodynamic wedging action in response to relative rotation of said second annular dynamic sealing lip (127B) and the first machine component (109); and
  iii. a second dynamic exclusionary intersection (139B) of substantially abrupt form for contact with the first machine component (109) and facing and preventing intrusion of the second fluid (124) into the first fluid (121).

23. An annular hydrodynamic seal (103) for sealing between a groove counter-face (112) of first machine component (109) and a second machine component (118) having a relatively rotatable surface (115) and serving as a partition between first and second fluids (121, 124) and preventing intrusion of the second fluid (124) into the first fluid (121), comprising:

A. an annular seal body (104) having first (133) and second (136) seal ends;
B. a dynamic sealing lip (127) of generally circular configuration extending from said annular seal body (104) and defining a sloping dynamic sealing surface (140) of variable width and having a hydrodynamic inlet curvature (142) of variable position, said sloping dynamic sealing surface (140) and said hydrodynamic inlet curvature (142) converging and establishing an annular blend location (141);
C. a static sealing lip (128) of generally circular configuration extending from said annular seal body (104) and being located in generally opposed relation with said dynamic sealing lip (127), said static sealing lip (128) defining a sloping static sealing surface (131);
D. said sloping dynamic sealing surface (140) and said hydrodynamic inlet curvature (142) of said dynamic sealing lip (127) being deformed by compressive engagement with the relatively rotatable surface (115) and defining a hydrodynamic wedging angle and an interfacial contact footprint with respect to the relatively rotatable surface (115), said interfacial contact footprint having a first footprint edge (157) and a second footprint edge (160), said first footprint edge (157) being of non-circular configuration for hydrodynamically wedging a lubricating film of the first fluid (121) into said interfacial contact footprint responsive to relative rotational velocity, causing the lubricating film to migrate toward said second footprint edge (160); and
E. said sloping static sealing surface (131) having a lubricant side edge (132) and said sloping dynamic sealing surface (140) having a lubricant side edge defined by blend location (141), said sloping static sealing surface (131) and said sloping dynamic sealing surface (140) having a converging relationship on the sides thereof facing said lubricant side edge (132) and said blend location (141), respectively.

24. The annular hydrodynamic seal (103) of claim 23, comprising:
said dynamic sealing lip (127) having a dynamic exclusionary intersection (139) with said second seal end (136) and defining said second footprint edge (160) and being of substantially circular configuration for preventing hydrodynamic wedging action at said second seal end for excluding entry of the second fluid (124) into said interfacial contact footprint.

25. The annular hydrodynamic seal (103) of claim 23, comprising:
said second seal end (136) being of generally convex geometry in the uncompressed state thereof and being deformed to a substantially planar geometry responsive to compression of said annular hydrodynamic seal (103) between the groove counter-face (112) of the first machine component (109) and the relatively rotatable surface (115).

26. The annular hydrodynamic seal (103) of claim 23, comprising:
said sloping dynamic sealing surface (140) and said sloping static sealing surface (131) each being disposed in angulated relation respectively with the relatively rotatable surface (115) and the groove counter-face (112) of said first machine component (109).

27. An annular hydrodynamic seal (103) for establishing sealing between first and second relatively rotatable members (109, 118) and serving as a partition between a first fluid (121) and a second fluid (124) and preventing intrusion of the second fluid (124) into the first fluid (121), comprising:

A. an annular seal body (104) having a first seal end (133) and a second seal end (136);
B. a dynamic sealing lip (127) being integral with said annular seal body (104) and defining at least one annular sloping dynamic sealing surface (140) establishing dynamic exclusionary intersection (139) with said second seal end (136);
C. said at least one annular sloping dynamic sealing surface (140) of said dynamic sealing lip (127) being deformed by compressive engagement with the second relatively rotatable member (118) and defining a dynamic sealing interface having an interfacial contact footprint having a first footprint edge (157) and a second footprint edge (160) and varying in width (W);
D. said at least one annular sloping dynamic sealing surface (140) defining a hydrodynamic wedging angle with respect to the second relatively rotatable member (118) for hydrodynamically wedging a lubricating film of the first fluid (121) into said dynamic sealing interface in response to relative rotational velocity, causing the lubricating film to migrate within said dynamic sealing interface toward the second footprint edge (160);
E. an annular static sealing lip (128) extending from said annular seal body (104) and being disposed in generally oppositely facing relation with said dynamic sealing lip (127), said annular static sealing lip (128) defining an annular sloping static sealing surface (131) establishing static exclusionary intersection (151) with said second seal end (136); and
F. said annular sloping static sealing surface (131) of said annular static sealing lip (128) being deformed by compressive engagement with the first relatively rotatable member (109) and defining a generally circular static interfacial contact footprint with the first relatively rotatable member (109), the generally circular static interfacial contact footprint having first and second footprint edges.

28. The annular hydrodynamic seal (103) of claim 27, comprising:
said interfacial contact footprint of said annular dynamic sealing lip (127) having greater interfacial contact pressure at said second footprint edge (160) resulting from deformation of said at least one annular sloping dynamic sealing surface (140) as compared with interfacial contact pressure at said first footprint edge (157).

29. The annular hydrodynamic seal (103) of claim 27, comprising:
at least one energizer element (163) loading said at least one annular sloping dynamic sealing surface (140) against the second relatively rotatable member (118) and establishing desired interfacial contact pressure therewith.

30. The annular hydrodynamic seal (103) of claim 27 comprising:
A. said annular seal body (104) defining a dynamic control surface (145) and a static control surface (148) being in substantially opposite facing relation with said dynamic control surface (145), said dynamic and static control surfaces resisting interference compression induced cross-sectional twisting of said annular seal body (104) and preserving interfacial contact pressure at said second footprint edge (160);

B. said annular seal body (104) defining a depth dimension (D) from said annular sloping static sealing surface (131) to said at least one annular sloping dynamic sealing surface (140);

C. said annular seal body (104) defining a length dimension (L) from said first seal end (133) to said second seal end (136); and D. the ratio of said length dimension (L) divided by said depth dimension (D) being greater than 1.2.

31. An annular hydrodynamic seal (103) for interference sealing between a first machine component (109) and a second machine component (118) having a relatively rotatable surface (115) and defining a sealed partition between a lubricant chamber of the first machine component (109) having a first fluid (121) and an environment having a second fluid (124), comprising:

A. an annular seal body (104) having a first seal end (133) and a second seal end (136);

B. an annular dynamic sealing lip (127) being defined by said annular seal body (104) having an annular dynamic sealing surface (140) of sloped configuration;

C. said second seal end (136) of said annular seal body (104) establishing dynamic exclusionary intersection (139) with said annular dynamic sealing surface (140); and D. upon compression of said annular seal body (104) between said first machine component (109) and the relatively rotatable surface (115) at least a portion of said annular dynamic sealing surface (140) being deformed by and assuming the configuration of the relatively rotatable surface (115) and establishing a dynamic sealing footprint of varying width throughout the circumference thereof; and E. an annular static sealing lip (128) being defined by said annular seal body (104) and having an annular sloped static sealing surface (131) establishing static exclusionary intersection with said second seal end (136), said annular static sealing lip (128) being deformed by interference compression with the first machine component (109) to define a static sealing interface with the first machine component (109).

32. The annular hydrodynamic seal (103) of claim 31, comprising:

an energizer (163) being located within said annular seal body (104) and being located intermediate said annular dynamic sealing lip (127) and said annular static sealing lip (128) and respectively loading said dynamic and static sealing lips (127, 128) against the relatively rotatable surface (115) and the first machine component (109) respectively.

33. The annular hydrodynamic seal (103) of claim 32, comprising:

A. said second seal end (136) of said annular seal body (104) defining an annular recess (167); and B. said energizer (163) being located within said annular recess (167).

34. The annular hydrodynamic seal (103) of claim 32, comprising:

said energizer (163) being an annular spring of generally C-shaped cross-sectional configuration.

35. The annular hydrodynamic seal (103) of claim 32, comprising:

said energizer (163) being an annular member composed of an elastomer material having a modulus of elasticity less than the modulus of elasticity of said annular seal body (104).

36. A hydrodynamic seal (103) for sealing between a first machine component (109) and a second machine component (118) having a relatively rotatable surface (115) and serving as a partition between a first fluid (121) and a second fluid (124) and preventing intrusion of the second fluid (124) into the first fluid (121), comprising:

A. an annular seal body (104) having a first seal end (133) and a second seal end (136);

B. an annular static sealing lip (128) defining a static sealing surface (131) for establishing compressed sealing relation with the first machine component (109);

C. an annular dynamic sealing lip (127) in generally opposed relation to said annular static sealing lip (128) for establishing compressed sealing relation with the relatively rotatable surface (115) and defining:

i. a dynamic sealing surface (140) of generally annular form and having variable width and being for establishing compressed sealing relation with the second machine component (118);

ii. a hydrodynamic inlet curvature (142) that varies in position relative to said second seal end (136) to form at least one wave for providing hydrodynamic wedging action in response to relative rotation; and iii. a dynamic exclusionary intersection (139) of substantially abrupt form for facing and preventing intrusion of the second fluid (124) into the first fluid (121), D. said annular seal body (104) defining a depth dimension D from said static sealing surface (131) to said dynamic sealing surface (140); and E. the magnitude of said depth dimension D varying substantially in time with said position of said hydrodynamic inlet curvature (142).

37. A hydrodynamic seal (103) for sealing between a first machine component (109) and a second machine component (118) having a relatively rotatable surface (115) for serving as a partition between a first fluid (121) and a second fluid (124) and for preventing intrusion of the second fluid (124) into the first fluid (121), comprising:

A. an annular seal body (104) having a first seal end (133) and a second seal end (136), said second seal end being of generally convex configuration;

B. an annular dynamic sealing lip (127) for establishing compressed sealing relation with the relatively rotatable surface (115) and defining:

i. a dynamic sealing surface (140) of generally annular form and having variable width for establishing compressed sealing relation with the relatively rotatable surface (115);

ii. a hydrodynamic inlet curvature (142) that varies in position relative to said second seal end (136) and defines at least one wave for providing hydrodynamic wedging action in response to relative rotation; and iii. a dynamic exclusionary intersection (139) of substantially abrupt form facing the second fluid (124) and for preventing intrusion of the second fluid (124) into the first fluid (121).

* * * * *

UNITED STATES PATENT AND TRADEMARK OFFICE
CERTIFICATE OF CORRECTION

PATENT NO. : 6,767,016 B2
DATED : July 27, 2004
INVENTOR(S) : Jeffrey D. Gobeli et al.

It is certified that error appears in the above-identified patent and that said Letters Patent is hereby corrected as shown below:

Column 20,
Lines 27, 36 and 50, after the word "first", insert -- sloping --

Column 24,
Line 53, after the word "a", insert -- sloping --

Signed and Sealed this

Twenty-first Day of June, 2005

JON W. DUDAS
*Director of the United States Patent and Trademark Office*